United States Patent
Demir et al.

(10) Patent No.: US 11,958,096 B2
(45) Date of Patent: Apr. 16, 2024

(54) TRANSPORT SYSTEM FOR TRANSPORTING WORKPIECES ON A TRANSPORT PATH BETWEEN TWO PRODUCTION PROCESS STATIONS

(71) Applicant: Strothmann Machines & Handling GmbH, Schloss Holte-Stukenbrock (DE)

(72) Inventors: Nihat Demir, Lehrte (DE); Andreas Senge, Paderborn (DE); Tim Büllesbach, Werther (DE)

(73) Assignee: Strothmann Machines & Handling GmbH, Schloss Holte-Stukenbrock NRW (DE)

( * ) Notice: Subject to any disclaimer, the term of this patent is extended or adjusted under 35 U.S.C. 154(b) by 652 days.

(21) Appl. No.: 17/268,147

(22) PCT Filed: Jul. 11, 2019

(86) PCT No.: PCT/EP2019/068700
§ 371 (c)(1),
(2) Date: Mar. 1, 2021

(87) PCT Pub. No.: WO2020/035232
PCT Pub. Date: Feb. 20, 2020

(65) Prior Publication Data
US 2021/0205873 A1  Jul. 8, 2021

(30) Foreign Application Priority Data
Aug. 16, 2018 (DE) .................... 10 2018 119 934.1

(51) Int. Cl.
*B21D 43/10* (2006.01)
*B21D 43/18* (2006.01)
(Continued)

(52) U.S. Cl.
CPC ........... *B21D 43/105* (2013.01); *B21D 43/18* (2013.01); *B64C 39/024* (2013.01); *B65G 35/00* (2013.01);
(Continued)

(58) Field of Classification Search
CPC .... B21D 43/105; B21D 43/18; B64C 39/024; B65G 35/00; B65G 59/04; G05D 1/0094;
(Continued)

(56) References Cited

U.S. PATENT DOCUMENTS 8,370,003 B2 * 2/2013 So ............................ B64D 1/22
701/3
10,059,448 B1 * 8/2018 Shoemaker, Jr. .......... B63C 9/26
(Continued)

FOREIGN PATENT DOCUMENTS

| CH | 711717 A2 | 5/2017 |
|---|---|---|
| EP | 3186174 B1 | 7/2017 |
| WO | 2017/216766 A1 | 12/2017 |

*Primary Examiner* — Michael Collins
(74) *Attorney, Agent, or Firm* — Richard M. Goldberg

(57) ABSTRACT

A transport system (10) for transporting workpieces (12) on a transport path between two production process stations, includes a set of drones (18, 20), each of which includes at least one gripper (26), which is designed to releasably couple to a surface (28) of a workpiece, and a control device for the simultaneous coordinated control of the drones (18, 20) of the set in such a way that the grippers (26) of the drones (18, 20) couple to different coupling positions on the surface (28) of the workpiece (12) and the orientation of the workpiece (12) can be changed on a transport path between the production process stations by changing the relative positions of the drones (18, 20) while maintaining the relative distances of the coupling positions from one another.

12 Claims, 2 Drawing Sheets

(51) Int. Cl.
- *B64C 39/02* (2023.01)
- *B64U 10/13* (2023.01)
- *B64U 101/60* (2023.01)
- *B65G 35/00* (2006.01)
- *B65G 59/04* (2006.01)
- *G05D 1/00* (2024.01)

(52) U.S. Cl.
CPC .......... *B65G 59/04* (2013.01); *G05D 1/0094* (2013.01); *B64U 10/13* (2023.01); *B64U 2101/60* (2023.01); *B64U 2201/00* (2023.01)

(58) Field of Classification Search
CPC ............... B64U 10/13; B64U 2101/60; B64U 2201/00; B64U 2101/00
See application file for complete search history.

(56) References Cited

U.S. PATENT DOCUMENTS

| | | | |
|---|---|---|---|
| 10,520,953 B2* | 12/2019 | Cantrell | G06Q 10/06 |
| 11,325,707 B2* | 5/2022 | Beckhoff | G05D 1/0088 |
| 2009/0299551 A1* | 12/2009 | So | B64C 19/00 |
| | | | 701/3 |
| 2010/0084513 A1* | 4/2010 | Gariepy | G05D 1/0094 |
| | | | 244/190 |
| 2016/0165190 A1* | 6/2016 | Beckhaus | G06V 20/13 |
| | | | 348/82 |
| 2016/0271796 A1* | 9/2016 | Babu | B25J 9/1664 |
| 2017/0334134 A1* | 11/2017 | Herzog | B29C 64/182 |
| 2018/0074522 A1* | 3/2018 | Cantrell | B64C 39/024 |
| 2018/0246503 A1* | 8/2018 | Bauer | B64C 39/024 |
| 2018/0288372 A1* | 10/2018 | Kirzinger | B64C 39/024 |
| 2021/0155417 A1* | 5/2021 | Motowaki | B25J 15/0616 |
| 2022/0274248 A1* | 9/2022 | Yoshikuwa | B25J 9/043 |

* cited by examiner

TRANSPORT SYSTEM FOR TRANSPORTING WORKPIECES ON A TRANSPORT PATH BETWEEN TWO PRODUCTION PROCESS STATIONS

BACKGROUND OF THE INVENTION

This invention relates to a transport system for transporting workpieces on a transport path between two process stations of a production line.

It is frequently necessary in industrial production processes to transport workpieces between consecutive production process stations, in which the individual partial stages of the production are completed. A typical example of this would be presses in a press line. Plate shaped workpieces, such as for example metal sheets, are taken from a withdrawal station and introduced in a first press, in which a first pressing stage is carried out, then subsequently removed from this press, and then introduced into a further press for the carrying out of a second pressing stage, and so on. The spaces that are available for the free transport of the workpieces is frequently very limited, since there is frequently little available space both within the presses themselves and also between the individual pressing stations. These limitations do not only exist within press lines, which are here named exclusively by way of example and not limitedly for this invention, but rather also in other production lines with consecutive process stations. The term "Process Station" shall hereinafter also include a withdrawal station, in which the workpieces which have not yet been processed are available for transport to a subsequent production station, as well as also a storage station used for storage of the completely processed workpiece at the end of the production line.

On the basis of the mentioned limitations in space, the requirements placed on the corresponding transport systems during control and during operation are very high. These requirements must on the one hand be adapted to the work speeds of the individual Process Stations, while on the other hand the transport path between the Process Stations must be as narrowly defined as possible, to avoid collisions between the workpiece or parts of the transport systems and the stations themselves.

For example, linear conveyors with grippers, which are able to transport the workpiece from one Process Station to the next, or industrial robots, the arms of which exhibit many degrees of freedom, are known from the state of the art. According to the state of the art, the gripper must be adapted to the shape of the workpiece that is to be transported in order to be able to reliably grasp, orient and transport it. This is complex and expensive, and to be able to carry out a production process, a relatively large number of specially designed grippers must be available. In addition, the design of the known transport systems, i.e. in particular linear conveyors or industrial robots, results in limitations in the flexibility of the orientation of the workpieces and the choice of transport path. In particular, there is also no satisfactory solution for longer transport paths between two production Process Stations at a greater distance from each other. Robots or linear conveyors cannot bridge such longer distances or can do so only with great difficulty.

SUMMARY OF THE INVENTION

It is therefore a task of the present invention to create a transport system for transporting workpieces between two Process Stations that overcomes the aforementioned problems and is more flexible and cost-effective to use than the known systems. In particular, the transport system improved in this manner is intended to allow greater flexibility in the selection of the transport path and the orientation of the workpieces, even on longer transport paths, if necessary. The costs related to the use of the grippers are to be reduced.

These tasks are solved according to the invention by a transport system having the features of the claims.

The transport system according to the invention comprises a set of drones, i.e. unmanned flying objects, which are controlled by a common control device. Each of these drones comprises at least one gripper, for releasable coupling to a surface of a workpiece. This can be done making use of the same principles as for known grippers, which is to say, for example, by means of suction devices which are pneumatically operated and attach themselves by a negative pressure onto the surface of the workpiece for coupling. According to the invention, the grippers can, however, be designed in a considerably simpler manner, since different grippers assigned to different drones of the set can be coupled independently of one another at different coupling positions of the workpiece. This results in a significant advantage, as the grippers do not have to be assembled for a specific workpiece shape.

Rather, the adaptation to the workpiece results from the coordinated control of the positions of the drones at the coupling positions.

The control device is provided to simultaneously control the drones of the set in a coordinated manner, and in such a way that the orientation of the workpiece on a transport path between the Process Stations can be changed. This is done by changing the relative positions of the drones with respect to each other during flight. The relative distances of the coupling positions on the workpiece are hereby maintained.

A set of drones can thus be controlled by the control device in such a way that a workpiece provided in a first Process Station is grasped by their grippers and the drones transfer the workpiece along a predetermined flight path to the subsequent Process Station and deposit it there. During this transport, all drones of the set which are coupled to the workpiece are to be controlled by the control device in such a way that their coordinated flight paths result in the intended transport path of the workpiece and its orientation on this transport path. This results in very high flexibility in the selection of the transport path and the workpiece orientation.

According to a preferred embodiment of this invention, the grippers are swivel-mounted to the drones. In this manner, the actual flying body of the drone, including its drive system, can be held in a desired orientation (typically in a horizontal position), whereas the gripper is tilted to adapt to the bias of the workpiece surface at the coupling position intended for it. The ability of the grippers to tilt can, for example, be achieved through the use of ball joints, gimbals mounts, or the like.

Preferably, the grippers are replaceably attached to the drones. Such a replacement can be carried out in the event of technical malfunctions or for maintenance work, or also in special cases for converting a drone to a different type of gripper.

Furthermore, the grippers each preferably comprise at least one pneumatically operated suction device that can be operated by at least one negative pressure source.

Preferably, the drones each comprise at least one drive system that serves as a negative pressure source for operating a suction device. In this embodiment, typical drone propulsion systems, such as rotors or propellers, such as those used in multicopters, are exploited to generate a pressure difference. The resulting suction effect is used to operate the suction device.

Preferably, the drones individually comprise a negative pressure line for transmitting the negative pressure generated by the drive system to the suction device.

Furthermore, an end of the negative pressure line opposite the suction device preferably has an opening that opens into an enclosure of the drive system. In this manner, a Venturi effect generated by an air flow prevailing inside the enclosure can be utilized.

According to a preferred embodiment, at least one additional negative pressure source is provided to assist the drive system for operation of the suction device. This embodiment comes under consideration when the negative pressure generated by the drive system of the respective drone is not sufficient to operate the suction device. The drive system and the additional negative pressure source, which is independent of the drive system, then provide sufficient suction.

Furthermore, the transport system according to the invention is preferably characterized by control means for controlling the proportion of the negative pressure generated by the drive system or by an additional negative pressure source for operating a suction device. Such control means may be valves controlling the air flow between the additional source of negative pressure and the suction device.

According to another preferred embodiment of the invention, the set comprises three drones. This allows for three coupling positions to be defined, which are always in a plane that is not over-determined, as would be the case with a larger number of drones.

Preferably, the drones are multicopters.

The present invention further relates to a method for transporting workpieces on a transport path between two Process Stations by a transport system of the type described above, comprising the following steps:
  provision of a quantity of workpieces in a first Process Station,
  control of a workpiece provided in the first Process Station by means of a set of drones in such a way that the grippers of the drones of the set couple to different coupling positions on the surface of the controlled workpiece,
  transport of the workpiece by means of the set of drones on a transport path into a second Process Station by changing the spatial orientation of the workpiece by means of coordinated control of the drones in individual flight paths, wherein the relative distances between the coupling positions are maintained.

According to a preferred embodiment of this method, the coupling positions are in a plane, the spatial orientation of which is changed in the transport path between the first Process Station and the second Process Station.

According to a further embodiment of this method, the workpieces are plate shaped and at least the second Process Station is a press for pressing of the workpieces.

BRIEF DESCRIPTION OF THE DRAWINGS

Here below, a preferred embodiment of this invention is further detailed on the basis of the figures.

DETAILED DESCRIPTION

Figure 1:
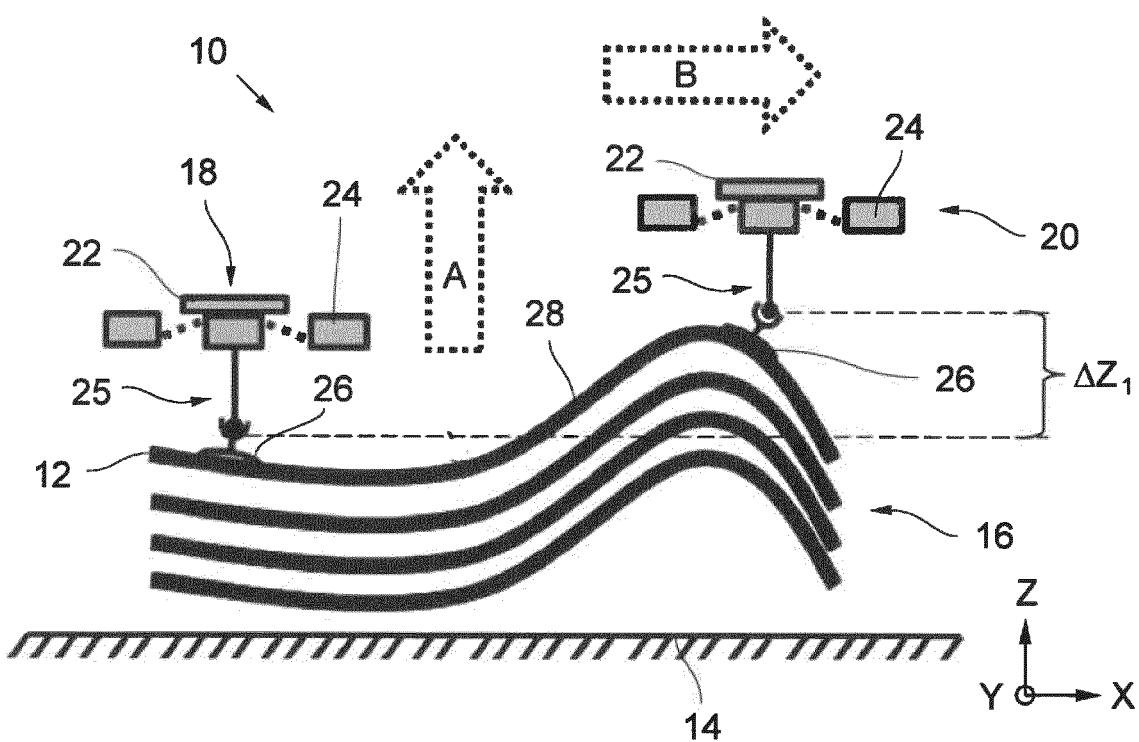
FIGS. 1 to 3 are schematic representations of an embodiment of the transport systems for transporting workpieces on a transport path between two Process Stations according to the invention, this as a demonstration of a transport method.
Figure 2:
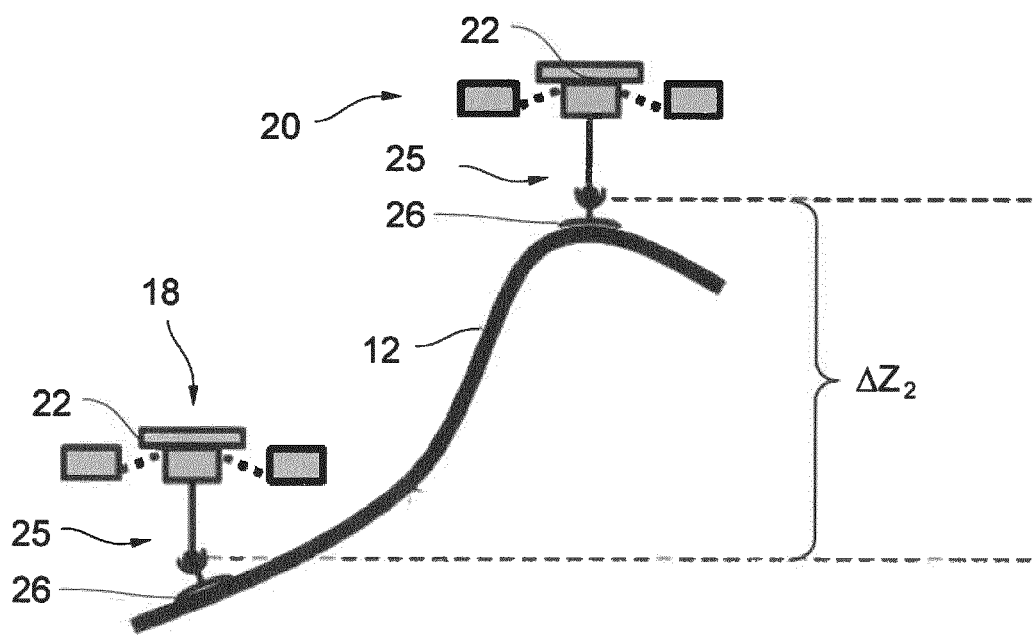
Figure 3:
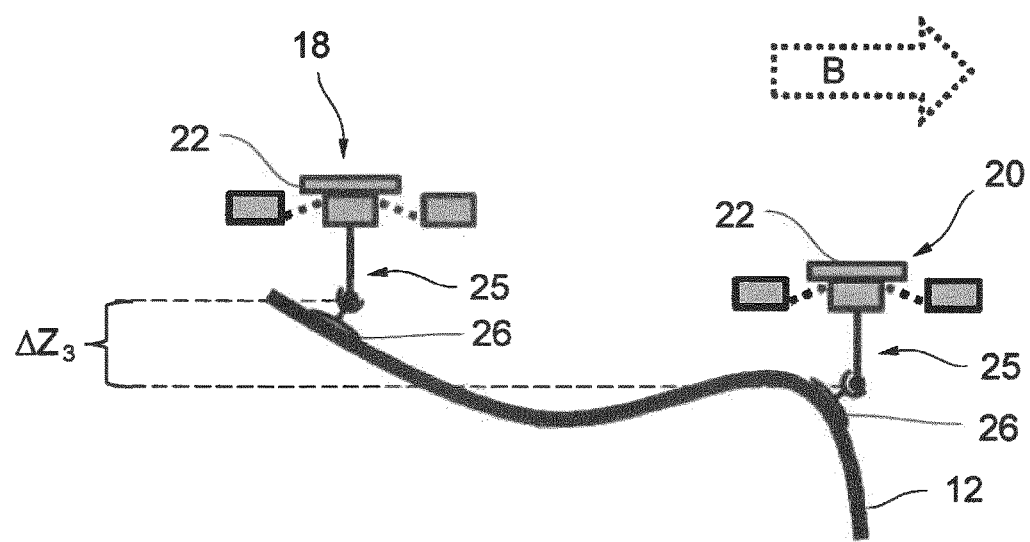

A transport system 10 for transporting workpieces 12 between two Process Stations is schematically represented in FIG. 1 to FIG. 3. In the case in point, these Process Stations are a withdrawal station 14 and a press that is not described in further detail. In the terminology used for this application, a first station like the withdrawal station 14 that is represented, in which no processing of the workpiece is carried out, is therefore also a Process Station within a production line. Similarly, a storage station used for storage of a finished workpiece can also represent a Process Station.

Workpiece 12 is the uppermost workpiece from a stack 16 of a quantity of workpieces, which are identically designed. The workpieces 12 are plate shaped, however not plane, which is to say, they are curved and shaped.

The workpieces 12 that are represented are intended to be introduced one following the other into a subsequent press that is the second Process Station. For this purpose, the transport system 10 provides to lift up the uppermost workpiece 12 of the stack 16 in the direction A (arrow), to transport it on a predetermined transport path to the press in the direction B (arrow) and to deposit it in the press, for example, onto a lower die provided therein in the opened press.

For this purpose, the transport system 10 according to the invention comprises a set of drones, of which two drones 18 and 20 are exemplarily shown in the figures. In fact, the set may also comprise more than two drones, for example, three drones. The present illustrations in FIG. 1 to FIG. 3 are thus simplified in this respect to elucidate the general transport principle.

The drones 18, 20 are substantially identically designed. They comprise a drone body 22 which includes at least one drive system 24. To achieve a stable flight path, multicopter drones 18, 20 that comprise a number of rotors as drive systems 24, which generate a downward airflow, have proven themselves to be effective. This causes the drone 18, 20 to rise. Quadrocopters with four rotors can, for example, be used as drive systems 24.

On the underside of the drone bodies 22, there are mounts 25 for grippers 26, which are intended to couple to the upper surface 28 of the workpiece 12. For this purpose, the grippers 26 are equipped with pneumatically operated suction devices, which will be described in more detail. In the simplest case, each gripper 26 may comprise a single suction device, which attaches itself at a specific surface point of the surface 28 of the workpiece 12 by negative pressure. The operation of such a suction device of a gripper 26 will be described in further detail below.

The mount 25 allows the respective gripper 26 to swivel with respect to the drone body 22. In FIG. 1, it is, for example, shown that the drone 18 on the left in the figure shows a gripper 26 in a different angular orientation than the drone 20 on the right. The different angular orientations of the grippers 26 serve to adapt to the inclination of the surface 28 of the workpiece 12 in the respective intended coupling position. Since the surface has a greater inclination due to a strong curvature of the workpiece 12 on the right side in FIG. 1, the gripper 26 is also accordingly inclined in order to be able to lie flat against the surface 28. Due to the ability to swivel of the grippers 26, it is possible for the drones 18, 20 to maintain a horizontal orientation of their drone body 22, including of their drive systems 24, even in tilted or swiveled positions of their grippers 26. According to the illustration in FIG. 1, this means that the drone bodies 22 of the drones 18, 20 can maintain their horizontal orientation within the set even though their grippers 26 are swiveled differently.

The grippers 26 may further be replaceably attached to the drones 18, 20. To this end, the mounts 25 can comprise corresponding releasable coupling mechanisms. The ability to swivel of the grippers 26 can be ensured, for example, by ball joints, gimbal mounts or the like.

The transport of a workpiece 12 by the transport system 10 according to the invention on a provided transport path into the subsequent Process Station, namely the press, will be described in the following. Here, the horizontal transport direction B corresponds to a spatial direction X from left to right in the drawings, and the upward lifting direction perpendicular thereto corresponds to a spatial direction Z.

According to FIG. 1, the drones 18, 20 of a set couple with their grippers 26 at different coupling positions on the surface 28 of the workpiece 12 (in the present example at a front and a rear coupling position with respect to the transport direction). Since the workpiece 12 does not lie flat in a plane, the drones 18, 20 of the set are at different flight altitudes when coupled. An altitude difference between the different coupling positions of the drones 18, 20 is denoted by $\Delta Z_1$. The illustration of the coupling positions is only schematic and not geometrically precise.

The uppermost workpiece 12 of the stack 16 is separated by the drones 18, 20, which as shown in FIG. 1 are moving vertically in an upwards direction (direction Z). In the separated state, the workpiece 12 is thus held freely by the grippers 26 and can be rotated in space.

FIG. 2 shows a position on the transport path from the removal station 14 in FIG. 1 to the subsequent press. A counterclockwise rotation about a horizontal axis Y perpendicular to axes X and Z is performed by increasing the difference in altitude between drones 18, 20. This also increases the difference in coupling positions $\Delta Z_2$, which is now greater than $\Delta Z_1$. The rotation shown in FIG. 2 is only exemplary for further free rotations in space, for example, also around the axis parallel to the transport direction. Such a rotation could be achieved by changing the flight altitudes of drones flying next to each other.

During this rotation, the drone bodies 22 maintain their spatial orientation. This is possible due to the ability to swivel of the grippers 26 with respect to the drone bodies 22. In this, it is essential to have common control of all drones 18, 20 of a set by a common control device which coordinates the drones 18, 20. This allows the transport path of the workpiece 12 to be specified, namely by coordinating the individual flight paths of the drones 18, 20. The relative positions of the drones 18, 20 with respect to each other are changed by the control device in such a manner that the relative distances of the coupling positions from each other are maintained. This prevents stresses from occurring on the grippers 26 that could cause the gripper 26 to detach from the surface 28 of the workpiece 12.

In FIG. 3, the workpiece 12 is shown in a third position in which it is rotated clockwise about the Y-axis relative to its position in FIG. 2, again by changing the flight altitudes of the drones 18, 20 while maintaining the distances between their coupling positions. Here, the difference in altitude of the coupling positions is approximately $\Delta Z_3 \ll \Delta Z_2$. In this orientation, the workpiece can be transported further or deposited into the press.

The grippers 26 are simple in design and need not be configured for a specific workpiece 12. For example, it is possible to use the same set of drones 18, 20 with the same grippers for a differently shaped workpiece 12. All that needs to be changed in this case is the programming of the control device to define the transport path by specifying the individual flight paths of the drones 18, 20.

Figure 4:
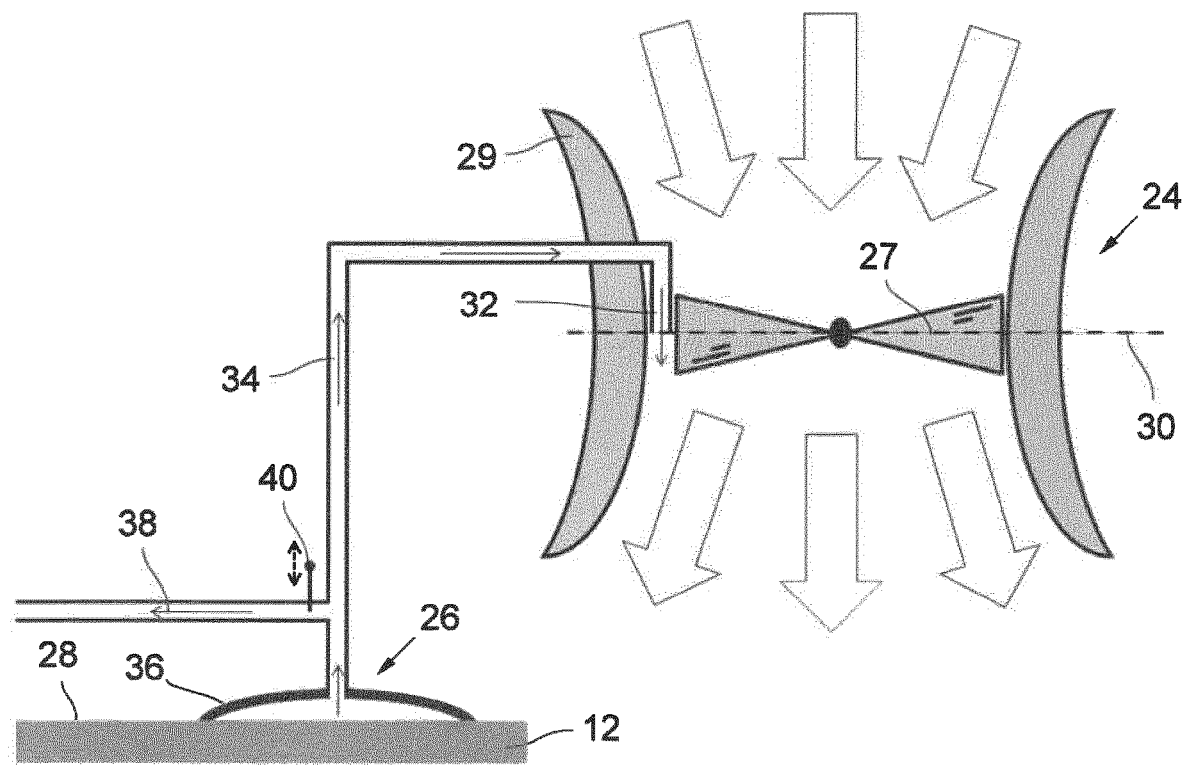
FIG. 4 is a schematic representation of the components of a drone, this for elucidation of the principle of creation of negative pressure.

FIG. 4 shows the principle of generating the negative pressure for operating the pneumatic suction device of a drone 18, 20. The drive system 24 comprises a rotor 27 with a vertical axis of rotation that generates an airflow from above downwards within an enclosure 29. A horizontal center plane 30 of the rotor 27 is at the level of the smallest free cross-section within the enclosure 29, and therefore at the level at which the highest differential pressure occurs.

The opening 32 of a negative pressure line 34 is arranged within the enclosure 29 at the level of this plane 30, the opposite end of line 34 opens into a suction cup 36 of the gripper 26. The negative pressure generated by the rotor 27 is thus transmitted through the negative pressure line 34 to the suction cup 36, which is able to attach by suction on the surface 28 of the workpiece 12.

In the case in point, the negative pressure generated by the drive 24 is therefore used to operate the suction cup 36. Additionally, in the present embodiment, another source of negative pressure is provided to assist the drive system 24 as the primary source of negative pressure. A negative pressure line 38 leads to this additional negative pressure source, which opens into the negative pressure line 34 between the drive system 24 and the suction cup 36. Just upstream of the confluence is a valve 40 which serves to partially or fully open or close the negative pressure line 38. The valve 40 thus serves as a means of control for controlling the portion of the negative pressure generated by the drive system 24 or by the additional negative pressure source at the suction cup 36.

What is claimed is:

1. A transport system for transporting plate-shaped curved workpieces on a transport path between two process stations of a production line, comprising:
   a set of drones, with each drone comprising at least one gripper swivel mounted on the drone body and comprising at least one pneumatically operated suction device, which is adapted to be operated by at least one negative pressure source, to releasably couple to a surface of a workpiece, and
   a control device for the simultaneous coordinated control of the drones of the set, in such a way that the grippers of the drones of the set couple to different coupling positions on the surface of one single workpiece and the orientation of the workpiece can be changed on a transport path between the process stations by changing the relative positions of the drones while maintaining the relative distances of the coupling positions from one another and the spatial orientation of the drone bodies.

2. The transport system according to claim 1, wherein the grippers are replaceably mounted on the drones.

3. The transport system according to claim 1, wherein the drones each comprise at least one drive system that serves as a negative pressure source for operation of a suction device.

4. The transport system according to claim 3, wherein the drones each comprise a negative pressure line for transmission of the negative pressure generated by the drive system to the suction device.

5. The transport system according to claim 4, wherein an end of the negative pressure line opposite to the suction device has an opening that opens into an enclosure of the drive system.

6. The transport system according to claim 1, wherein the set comprises three drones.

7. The transport system according to claim 1, wherein the drones are multicopters.

8. A method for transport of workpieces on a transport path between two process stations by a transport system according to claim 1, comprising the following steps:
providing a quantity of workpieces in a first process station,
controlling one single plate-shaped curved workpiece provided in the first process station by a set of drones in such a way that grippers of the drones of the set couple to different coupling positions on a surface of the controlled workpiece, and
transporting the workpiece by the set of drones on a transport path into a second process station by changing the spatial orientation of the workpiece by coordinated control of the drones in individual flight paths, wherein the relative distances between the coupling positions and the spatial orientation of the drone bodies are maintained.

9. The method according to claim 8, wherein the coupling positions are in a plane, and comprising the step of changing the spatial orientation thereof in the transport path between the first process station and the second process station.

10. The method according to claim 8, wherein the workpieces are plate shaped and at least the second process station is a press for pressing of the workpieces.

11. A transport system for transporting workpieces on a transport path between two process stations of a production line, comprising:
a set of drones, with each drone comprising at least one gripper which is designed to releasably couple to a surface of a workpiece, and
a control device for the simultaneous coordinated control of the drones of the set, in such a way that the grippers of the drones couple to different coupling positions on the surface of the workpiece and the orientation of the workpiece can be changed on a transport path between the process stations by changing the relative positions of the drones while maintaining the relative distances of the coupling positions from one another,
wherein the grippers each comprise at least one pneumatically operated suction device, which can be operated by at least one negative pressure source,
wherein the drones each comprise at least one drive system that serves as a negative pressure source for operation of a suction device, and
at least one additional negative pressure source to assist the drive system in operation of a suction device.

12. The transport system according to claim 11, comprising a control for controlling:
a portion of the negative pressure generated by the drive system and
an additional negative pressure source for operation of a suction device.

* * * * *